United States Patent
McGuire et al.

(10) Patent No.: US 11,254,878 B2
(45) Date of Patent: Feb. 22, 2022

(54) FCC CATALYST HAVING ALUMINA DERIVED FROM CRYSTALLINE BOEHMITE

(71) Applicant: BASF Corporation, Florham Park, NJ (US)

(72) Inventors: Robert McGuire, Nanuet, NY (US); Gary Smith, Verona, NJ (US); Bilge Yilmaz, New York, NY (US); Sven Serneels, Township of Washington, NJ (US)

(73) Assignee: BASF CORPORATION, Florham Park, NJ (US)

( * ) Notice: Subject to any disclaimer, the term of this patent is extended or adjusted under 35 U.S.C. 154(b) by 0 days.

(21) Appl. No.: 16/824,061

(22) Filed: Mar. 19, 2020

(65) Prior Publication Data
US 2020/0224102 A1   Jul. 16, 2020

Related U.S. Application Data

(62) Division of application No. 15/264,428, filed on Sep. 13, 2016, now Pat. No. 10,633,596.
(Continued)

(51) Int. Cl.
*C10G 11/05* (2006.01)
*C10G 11/18* (2006.01)
(Continued)

(52) U.S. Cl.
CPC ............ *C10G 11/05* (2013.01); *B01J 29/084* (2013.01); *B01J 35/023* (2013.01); *B01J 35/08* (2013.01);
(Continued)

(58) Field of Classification Search
None
See application file for complete search history.

(56) References Cited

U.S. PATENT DOCUMENTS

| 3,586,523 A | 6/1971 | Fanselow et al. |
| 4,493,902 A | 1/1985 | Brown et al. |

(Continued)

FOREIGN PATENT DOCUMENTS

| KR | 10-2007-0001987 A | 1/2007 |
| RU | 2522438 C2 | 7/2014 |

(Continued)

OTHER PUBLICATIONS

Venuto PB, Habib T. Catalyst-feedstock-engineering interactions in fluid catalytic cracking. Catalysis Reviews Science and Engineering. Jan. 1, 1978;18(1): Abstract only.
(Continued)

*Primary Examiner* — Tam M Nguyen
(74) *Attorney, Agent, or Firm* — Lowenstein Sandler LLP

(57) ABSTRACT

A zeolite fluid catalytic cracking catalyst is provided that passivates nickel and vanadium during catalytic cracking. The zeolite fluid catalytic cracking catalyst includes Y-faujasite crystallized in-situ from a metakaolin-containing calcined microsphere. The zeolite fluid catalytic cracking catalyst further includes an alumina-containing matrix obtained by calcination of a dispersible crystalline boehmite and a kaolin contained in the metakaolin-containing calcined microsphere, where the dispersible crystalline boehmite has a crystallite size of less than 500 Å. Also provided are a method of reducing contaminant coke and hydrogen yields and a method of catalytic cracking of heavy hydrocarbon feed stocks.

19 Claims, 2 Drawing Sheets

Related U.S. Application Data

(60) Provisional application No. 62/351,602, filed on Jun. 17, 2016.

(51) Int. Cl.
  *B01J 35/08* (2006.01)
  *B01J 35/02* (2006.01)
  *B01J 29/08* (2006.01)
  *B01J 35/10* (2006.01)

(52) U.S. Cl.
  CPC ....... *B01J 35/1009* (2013.01); *B01J 35/1014* (2013.01); *B01J 35/1019* (2013.01); *C10G 11/18* (2013.01); *B01J 2229/42* (2013.01); *C10G 2300/205* (2013.01)

(56) References Cited

U.S. PATENT DOCUMENTS

| | | | |
|---|---|---|---|
| 4,631,262 A | 12/1986 | Altomare | |
| 4,789,654 A | 12/1988 | Hirano et al. | |
| 5,395,809 A | 3/1995 | Madon et al. | |
| 6,403,526 B1 | 6/2002 | Lussier et al. | |
| 6,656,347 B2 | 12/2003 | Stockwell et al. | |
| 6,673,235 B2 | 1/2004 | Harris et al. | |
| 6,716,338 B2 | 4/2004 | Madon et al. | |
| 6,942,783 B2 | 9/2005 | Xu et al. | |
| 7,208,446 B2 | 4/2007 | Stamires et al. | |
| 2003/0089640 A1 | 5/2003 | Madon et al. | |
| 2003/0136707 A1 | 7/2003 | Harris et al. | |
| 2004/0235642 A1 | 11/2004 | Xu et al. | |
| 2008/0261802 A1 | 10/2008 | Du et al. | |
| 2008/0314798 A1* | 12/2008 | Stockwell ................ B01J 21/16 208/118 |
| 2010/0152024 A1 | 6/2010 | Stamires et al. | |
| 2011/0000821 A1* | 1/2011 | Stockwell .............. C10G 11/18 208/120.01 |
| 2011/0132808 A1* | 6/2011 | Fu ........................... C10G 25/09 208/253 |
| 2012/0118793 A1* | 5/2012 | Hoffer ...................... B01J 23/18 208/120.2 |
| 2012/0228194 A1* | 9/2012 | Folmar .................... B01J 27/18 208/119 |
| 2013/0252802 A1 | 9/2013 | Gao et al. | |
| 2015/0174559 A1* | 6/2015 | Smith .................... C10G 11/05 208/114 |
| 2017/0362513 A1* | 12/2017 | McGuire ................. B01J 35/08 |

FOREIGN PATENT DOCUMENTS

| | | |
|---|---|---|
| WO | 95-31280 A1 | 11/1995 |
| WO | 03054114 A2 | 7/2003 |

OTHER PUBLICATIONS

Okata, et al., "Characterization of spinel phase from SiO2—2O3 xerogels and the formation process of mullite", Journal of the American Ceramic Society, 69 [9] 652-656 (1986).
Breck, Donald W. "Zeolite molecular sieves." p. 369(Jul. 1973).
Grim, Ralph E. "Applied clay mineralogy." GFF 84.4 (1962): pp. 394-399.
International Search Report and Written Opinion of International Searching Authority for PCT/US2017/37853 dated Sep. 15, 2017, 11 pages.
D.L. Trimm and A. Stanislaus, The Control of Pore Size in Alumina Catalyst Supports: A Review, 21 Appl. Catal. 215-238(1986).
"Crystallite" in Oxford Dictionary of English (3 ed.) (2015).

* cited by examiner

FCC CATALYST HAVING ALUMINA DERIVED FROM CRYSTALLINE BOEHMITE

PRIORITY CLAIM

This application is a divisional of Non-Provisional U.S. patent application Ser. No. 15/264,428, filed on Sep. 13, 2016, now U.S. Pat. No. 10,633,596, which claims the benefit of priority to U.S. Provisional Patent Application No. 62/351,602, filed Jun. 17, 2016, which are hereby incorporated by reference herein in their entirety.

TECHNICAL FIELD

This disclosure relates to catalysts and methods for cracking heavy hydrocarbon feed stocks, such as resid and resid-containing feeds, which contain high levels of nickel (Ni) and vanadium (V) contaminants.

BACKGROUND

The commercial success of a resid-FCC catalyst relies on the ability of the catalyst to maintain activity and selectivity in the presence of contaminant metals. Resid feeds contain small amounts (e.g., 1-5 ppm) of contaminant metals that cumulatively deposit on the catalyst, result in high $H_2$ and coke yields. Even small increases in the yields of these products relative to the yield of gasoline can cause significant practical problems. For example, in commercial refineries, expensive compressors are used to handle high volume gases, such as hydrogen. Therefore, an increase in the volume of hydrogen produced, can add substantially to the capital expense of the refinery. Nickel deposited on the resid-FCC catalysts from the feed is predominantly responsible for higher hydrogen and coke yields through catalysis of dehydrogenation reactions. In order to improve the performance characteristics of catalysts, reactive materials such as reactive alumina may be incorporated into FCC catalysts (e.g., crystalline boehmite) to maintain the activity and selectivity characteristics in the presence of contaminate metals. Alumina may react with NiO, resulting in the formation of $NiAl_2O_4$ that lowers dehydrogenation activity by preventing reduction of the nickel metal crystalline boehmite. Flex-Tech® by BASF Corporation, for example, is a modified microsphere catalyst having transition alumina derived from crystalline boehmite.

Other catalysts including boehmite are well known. For example, U.S. Pat. No. 4,789,654 to Hirano, et al. relates to a hydrocracking catalyst comprising a hydrogenating active component supported on a catalyst carrier consisting of a precursor of an alumina-containing inorganic oxide and a zeolite, where the alumina may be pseudoboehmite. However, such catalyst is not suitable for fluid catalytic cracking.

U.S. Pat. No. 7,208,446 to Stamires, et al. relates to a composition comprising a quasi-crystalline boehmite precursor and a zeolitic additive.

U.S. Pat. No. 6,403,526 to Lussier, et al. relates to a porous composite comprising gamma alumina, crystalline boehmite, and a crystal growth inhibitor.

PCT Publication No. WO1995/031280 to Shukis, et al. relates to a catalyst composition comprising a porous support of a gamma alumina, nanocrystalline alumina, and a catalytically active material.

U.S. Pat. No. 6,716,338 to Madon, et al. relates to a FCC catalyst comprising microspheres having in-situ zeolite and matrix made from boehmite and ultrafine kaolin.

U.S. Pat. No. 6,942,783 to Xu, et al. relates to a FCC catalyst with high porosity comprising boehmite and in-situ zeolite crystals distributed within calcined microspheres.

U.S. Pat. No. 6,673,235 to Harris, et al. relates to a FCC catalyst comprising macroporous matrix, in-situ crystallized zeolite, and transitional alumina.

However, boehmite samples from different suppliers are unexpectedly found to contribute to different catalytic performances when the boehmite samples are incorporated into FCC catalysts. Thus, there is a need for an improved FCC catalyst.

SUMMARY

A zeolite fluid catalytic cracking catalyst is provided that passivates nickel and vanadium during catalytic cracking. The zeolite fluid catalytic cracking catalyst includes Y-faujasite crystallized in-situ from a metakaolin-containing calcined microsphere. The zeolite fluid catalytic cracking catalyst further includes an alumina-containing matrix obtained by calcination of a dispersible crystalline boehmite and a kaolin contained in the metakaolin-containing calcined microsphere, wherein the dispersible crystalline boehmite has a crystallite size of less than 500 Å.

A method is provided of reducing contaminant coke and hydrogen yields. The method includes passivating, during catalytic cracking, nickel and vanadium with the zeolite fluid catalytic cracking catalyst. A method is provided of catalytic cracking of heavy hydrocarbon feed stocks, the method comprising passivating, during the catalytic cracking, nickel and vanadium with the zeolite fluid catalytic cracking catalyst.

BRIEF DESCRIPTION OF THE DRAWINGS

The present disclosure is illustrated by way of example, and not by way of limitation, in the figures of the accompanying drawings, in which.

DETAILED DESCRIPTION

Figure 1:
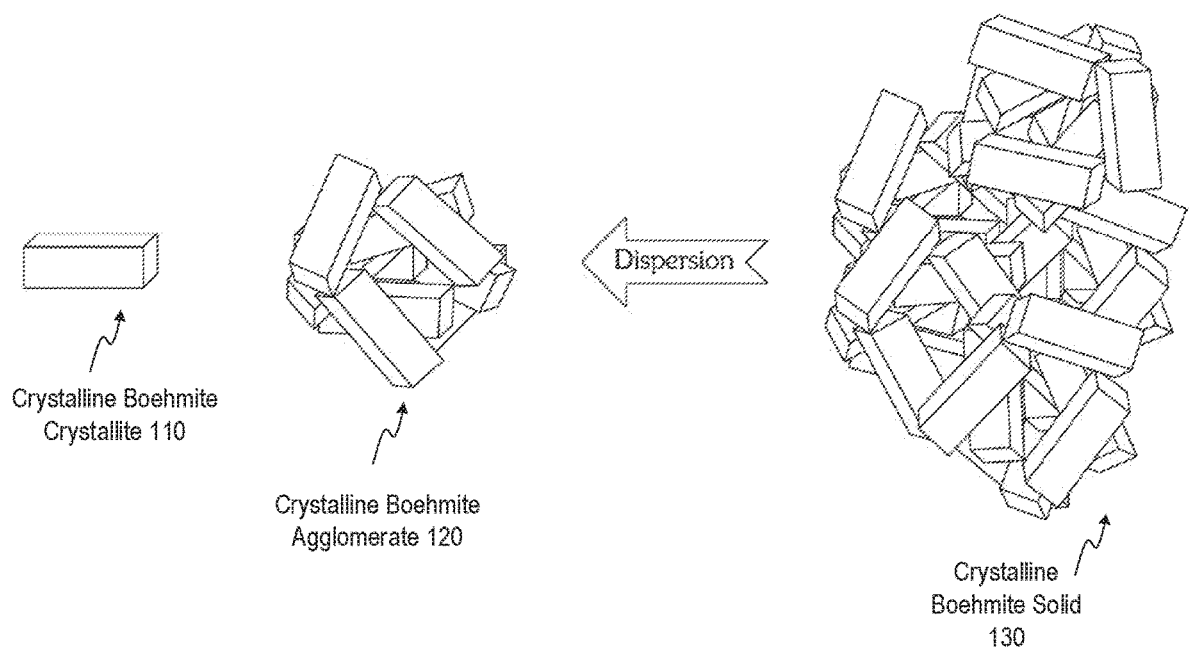
FIG. 1 illustrates different types of crystalline boehmite, according to one embodiment.

Before describing several exemplary embodiments of the disclosure, it is to be understood that the disclosure is not limited to the details of construction or process steps set forth in the following description. The disclosure is capable of other embodiments and of being practiced or being carried out in various ways.

An in-situ fluid cracking catalyst is disclosed which is useful in cracking feeds that contain nickel and vanadium. The FCC catalyst of this disclosure may be made from microspheres, which initially contain kaolin, binder, and a dispersible crystalline boehmite alumina. The microsphere is subsequently converted using standard in-situ Y zeolite growing procedures to make a Y-faujasite containing catalyst. Exchanges with ammonium and rare earth cations with appropriate calcinations provides a FCC catalyst that contains a transitional alumina fully obtained from dispersed primary crystalline boehmite agglomerates, which, in one embodiment, have a crystallite size of larger than 150 Å, but less than 500 Å. In another embodiment, the crystalline boehmite has a crystallite size that is less than 400 Å. In another embodiment, the crystalline boehmite has a crystallite size that is less than 300 Å. The catalyst is metals tolerant, has good catalytic selectivity, and may be used as a catalyst for cracking resids and resid-containing feeds.

Preparation of the fluid cracking catalyst, in accordance with one embodiment of this disclosure, involves an initial step of preparing microspheres comprising hydrous kaolin clay and/or metakaolin, a dispersible crystalline boehmite ($Al_2O_3$, $H_2O$), optionally spinel and/or mullite, and a sodium silicate or silica sol binder. The microspheres are calcined to convert any hydrous kaolin component to metakaolin. The calcination process transforms the dispersible boehmite into a transitional alumina phase (e.g., gamma alumina). The calcined microspheres are reacted with an alkaline sodium silicate solution to crystallize zeolite Y and are ion-exchanged. The transitional alumina phase (that results from the dispersible crystalline boehmite during the preparative procedure) forms the matrix of the final catalyst and passivates the Ni and V that are deposited on to the catalyst during the cracking process, especially during cracking of heavy residuum feeds. The FCC catalyst further has an unexpected reduction in contaminant coke and hydrogen yields. Contaminant coke and hydrogen arise due to the presence of Ni and V and reduction of these byproducts significantly improves FCC operation.

FCC catalysts may be made by spray drying a feed mixture of hydrated kaolin, metakaolin, and a binder such as silica sol or sodium silicate. In one embodiment, the spray-dried microspheres are acid-neutralized and washed to reduce sodium content. The spray-dried microspheres may be subsequently calcined to form precursor porous microspheres. In one embodiment, the hydrous kaolin is maintained as an inert component by calcining at lower temperatures so as to avoid the endothermic transformation of the hydrous kaolin component to metakaolin. Calcination temperatures of less than 1000° F., preferably less than 800° F., can be used to calcine the spray dried microspheres.

The amount of metakaolin in the spray dried and optionally calcined microspheres provides the soluble alumina available to grow zeolite. The amount of metakaolin present in the spray-dried microspheres is limited with respect to the inerts such as hydrous kaolin so that the yield of zeolite is limited during crystallization. An excessive level of metakaolin in the reactive microsphere would yield a high level of zeolite that would reduce the porosity of the microsphere to an undesired low level. Accordingly, in one embodiment, the spray dried microspheres, after optional calcination, contain a metakaolin content of up to 50 wt. %. In another embodiment, the spray dried microspheres, after optional calcination, contain a metakaolin content of up to 45 wt. %. In another embodiment, the spray dried microspheres, after optional calcination, contain a metakaolin content of 30-40 wt. %.

In one embodiment, any binder used contains only sodium, expressed as $Na_2O$, which is easily removed. Although the silica or silicate binders traditionally used do bring these nutrients into the zeolite crystallization process, the binders are to provide mechanical strength to the green microspheres sufficient to withstand processing up until crystallization. Therefore, a binder capable of fulfilling this role while not interfering with the other constraints described herein may be used. Aluminum chlorohydrol for example may be used as the binder.

The precursor microspheres are reacted with zeolite seeds and an alkaline sodium silicate solution, substantially as described in U.S. Pat. No. 5,395,809, the teachings of which are incorporated herein by cross-reference. The microspheres are crystallized to a desired zeolite content (typically about 40-75%), filtered, washed, ammonium exchanged, exchanged with rare-earth cations if required, calcined, exchanged a second time with ammonium ions, and calcined a second time if required.

Table 1, below, shows compositions of the solids in the slurries that are spray dried to form porous microspheres, and later optionally calcined at low temperature to prepare precursor reactive microspheres. Table 1 displays the ingredients of the compositions as the weight percent of metakaolin and inerts on a binder-free basis. The inerts may include one or more of hydrated kaolin, calcined boehmite for metal passivation, or kaolin calcined through the exotherm (spinel or mullite). Table 1 displays the weight % $SiO_2$ binder based on the grams of $SiO_2$ in the binder per gram of total weight of moisture-free spray dried microspheres and provided by sodium silicate. In one embodiment, the spray dried microspheres will have a size of from about 20 to 150 microns. In another embodiment, the size of the spray dried microspheres will range from about 50 to 100 microns. In another embodiment, the size of the spray dried microspheres will range from about 65-90 microns.

TABLE 1

| Ingredients | First Embodiment (weight %) | Second Embodiment (weight %) | Third Embodiment (weight %) |
| --- | --- | --- | --- |
| Hydrated Kaolin | 5-80 | 10-75 | 15-70 |
| Metakaolin | 20-50 | 25-45 | 30-45 |
| Boehmite Alumina (calcined) | 0-30 | 10-25 | 15-25 |
| Kaolin calcined through exotherm | 0-40 | 5-30 | 10-30 |
| Binder | 2-35 | 4-25 | 5-15 |

Hydrous kaolin is used as an inert in the slurry and acts as an alumina-containing matrix precursor of the catalyst. Thus, once crystallized, the zeolite catalyst may contain a silica-alumina matrix derived from the hydrous kaolin. The hydrous kaolin used as the alumina-containing matrix precursor of the catalytic microspheres is not singularly critical and can be obtained from a wide variety of commercial sources. The hydrous kaolin can suitably be either one or a mixture of ASP® 600 or ASP® 400 kaolin, derived from coarse white kaolin crudes. Finer particle size hydrous kaolins can also be used, including those derived from gray clay deposits, such as LHT pigment. Purified water-processed kaolins from Middle Georgia have been used with success. The particle size of the hydrous kaolin is generally known to have an impact on microsphere porosity, so the resultant crystallized catalyst macroporosity can be manipulated in part by manipulation of the hydrous kaolin particle size. The present assignee for example has shown that coarser hydrous kaolin yields higher macropore volume in microspheres. Since the present disclosure comprises several parameters that effect changes in catalyst macroporosity, there remains some flexibility in the choice of the hydrous kaolin particle size.

Calcination of these hydrous kaolins at temperatures of 1200° F. results in endothermic dehydroxylation of the hydrous kaolin to metakaolin which can be used as the metakaolin component of the feed slurry.

In one embodiment, silicate for the binder is provided by sodium silicates with $SiO_2$ to $Na_2O$ ratios of from 1.5 to 3.5. In another embodiment, silicate for the binder is provided by sodium silicates with $SiO_2$ to $Na_2O$ ratios of from 2.00 to 3.22.

Alternatively, the non-zeolitic, alumina-containing matrix of the catalysts of the present disclosure can be derived in part from a hydrous kaolin source that is in the form of an ultrafine powder pulverized and calcined through the exotherm. Typical zeolite microspheres have been formed with an alumina-containing matrix derived from kaolin having a larger size than used in this disclosure and which is calcined at least substantially through its characteristic exotherm. Satintone® No. 1, (a commercially available kaolin that has been calcined through its characteristic exotherm without any substantial formation of mullite) is a material used on a commercial basis to form the alumina-containing matrix. Satintone® No. 1 is derived from a hydrous kaolin in which 70% of the particles are less than 2 microns. Other sources having been used to form the alumina-containing matrix include finely divided hydrous kaolin (e.g., ASP® 600, a commercially available hydrous kaolin described in Engelhard Technical Bulletin No. TI-1004, entitled "Aluminum Silicate Pigments" (EC-1167)) calcined at least substantially through its characteristic exotherm. Booklet kaolin has found the most widespread commercial use and has met tremendous success worldwide. Before the previously mentioned U.S. Pat. No. 6,656,347, these larger kaolin particles represented the state of the art in forming the alumina-containing matrix of the catalyst microsphere and had no perceived deficits.

What is meant by "ultrafine" powder is that at least 90 wt. % of the hydrous kaolin particles are less than 2 microns in diameter, preferably less than 1 micron determined by Sedigraph™ (or sedimentation). It has been found that, in particular, use of hydrous kaolin pigments with this particle size distribution upon pulverization and calcination through the characteristic exotherm results in a greater quantity of macroporosity in the catalyst microsphere subsequent to zeolite crystallization. The loose packing of the calcined ultrafine kaolin, which has been found, can be likened to a "house of cards" in which the individual particulates are aligned randomly with respect to adjacent particles in a non-parallel manner. Moreover, the calcined ultrafine kaolin exists as porous aggregates of the "house of cards" morphology, providing not only a porous aggregate, but additional porous areas between aggregates. The ultrafine hydrous kaolin may be pulverized to provide the random stacking of the individual hydrous kaolin platelets.

The pulverized ultrafine hydrous kaolin, optionally used to derive a portion of the alumina-containing matrix, is calcined through its characteristic exotherm with or without the formation of mullite. A matrix source which can be used in this disclosure to form in part the macroporous (e.g., containing pores or cavities that are larger than 75 μm) zeolite microspheres is Ansilex® 93. Ansilex® 93 is made from the fine size fraction of a hard kaolin crude, by spray drying, pulverizing and calcining to prepare low abrasion pigments as described in U.S. Pat. No. 3,586,523, to Fanselow, et. al., the entire contents of which are herein incorporated by reference. The ultrafine hydrous matrix source is spray dried, pulverized and then calcined through the exotherm, optionally to mullite. U.S. Pat. No. 4,493,902 discloses calcining the kaolin to mullite until the X-ray diffraction intensities are comparable to a fully crystalline reference standard. While it is within the scope of the present disclosure to calcine the ultrafine hydrous kaolin beyond the exotherm such that the X-ray diffraction intensities are comparable to a fully crystalline referenced standard as disclosed in U.S. Pat. No. 4,493,902, the ultrafine hydrous kaolin may be calcined beyond the characteristic exotherm so as to convert the kaolin to small crystallite size mullite. The small crystallite size mullite has the appropriate diffraction lines and leached chemical composition of a fully crystalline mullite standard, but the diffractional lines are weaker inasmuch as the crystallites are smaller. The relationship between diffraction intensity/line width and crystallite size is well-known. The kaolin may be calcined beyond the exotherm to a small crystallite mullite matrix inasmuch as fully calcining the kaolin to mullite takes excessive time and temperature in practice. Furthermore, calcining kaolin beyond the exotherm to fully crystalline mullite can result in the macroporosity being lost due to sintering. Moreover, bulk density after calcining kaolin to fully crystalline mullite can be substantially increased. In one embodiment, the ultrafine hydrous kaolin is calcined through the exotherm has 20-80% of the integrated X-ray diffraction peak areas of a kaolin reference sample containing fully crystallized mullite. In another embodiment, the ultrafine kaolin is calcined through the exotherm such that it has 50-70% of the integrated X-ray diffraction peak areas of fully crystallized mullite.

What is unusual about the use of the Ansilex® material is that it is derived from hard kaolin. Hard kaolins typically have a gray tinge or coloration and are, thus, also referred to as "gray clays." These hard kaolins are further characterized by breaking into irregularly shaped fragments having rough surfaces. Hard kaolins also contain a significant amount of iron content. In one embodiment, hard kaolins contain about 0.6 to 1 wt. % of $Fe_2O_3$. Hard kaolin clays are described in Grim's "Applied Clay Mineralogy," 1962, McGraw Hill Book Company, pp. 394-398 thereof, the disclosure of which is incorporated by reference herein. The use of these materials to form part of the alumina-containing matrix for in-situ FCC microsphere catalysts has not been known previous to U.S. Pat. No. 6,656,347 although their use in the incorporated routes is well established. Hard kaolins have also occasionally been used as sources of metakaolin for in-situ microspheres. Use of the calcined gray clays in the in-situ matrix art would be precluded by (a) the high iron content thereof and the possibility that this could lead to coke and gas production, and (b) the dilatant nature of slurries formed therefrom, leading to apparently senseless waste of process time and increased cost in making down high viscosity slurries which spray dry at low solids. These dilatancy problems and porosity benefits are intrinsically and fundamentally linked. Reduced coke and gas was an especially sought-after object for in-situ catalysts, since the original formulations made coke and gas commensurate with their extraordinarily high level of amorphous matrix activity. This led to lower and lower levels of iron and spinel in subsequent disclosures. It is a surprising finding that there appears to be no relationship between the iron and coke and gas selectivities after all. Instead, substantial improvements in FCC dry gas and coke were obtained through process modifications like improved feed injection and riser termination devices reducing contact time.

The matrix can be derived at least in part from alumina-containing materials more generally characterized by the porosity thereof provided during the packing of the calcined material. A test has been developed to determine the pore volume of the calcined alumina-containing material which can be used to ultimately form a part of the matrix of the inventive catalyst. The test characterizes the water pore volume of the calcined alumina-containing material by determining the minimum amount of water to make a slurry from a sample of the solids. In the test, a powder sample is mixed with water containing a dispersant such as, for example, Colloid 211, Viking Industries, Atlanta, Ga., in a cup using a stirring rod or spatula. Just enough water is added to the dry sample to convert the dry powder to a single mass of dilatant mud which just begins to flow under its own weight. The incipient slurry point (ISP) is calculated from the weights of the sample and the water used. The incipient slurry point can be calculated as follows: ISP=[(grams of dry sample)/(grams of dry sample plus grams of water added)]× 100. The units are dimensionless and are reported as percent solids.

This amount of water is larger than the (internal) water pore volume of the sample, but is clearly related to the water pore volume. Lower incipient slurry point percent solids values indicate higher water absorption capacities or higher pore volume in the sample. In one embodiment, the calcined alumina-containing materials (from which the high-alumina matrix can be at least in part derived in accordance with this disclosure) have incipient slurry points less than 57% solids. In another embodiment, the calcined alumina-containing materials (from which the high-alumina matrix can be at least in part derived in accordance with this disclosure) have incipient slurry points from 48 to 52% solids. This compares with Satintone® No. 1 which yields over 58% solids in the incipient slurry point test.

Accordingly, not only is the ultrafine hydrous kaolin useful as an alumina-containing material which can be used to derive a portion of the matrix of the catalyst microspheres, but the matrix may also be derived in part from delaminated kaolin, platelet alumina, and precipitated alumina. Methods of delaminating booklets or stacks of kaolin may include using a particulate grinding medium (e.g., sand, glass microballoons). Subsequent to delamination, the platelets are pulverized to derive the random packing or "house of cards" morphology.

An advantage of the matrix precursors meeting the ISP test specification is that they bring higher pore volume per unit matrix surface area. This maximizes the effectiveness of the catalyst by minimizing both catalytic coke (pore volume) and contaminant coke (matrix surface area).

It is also within the scope of this disclosure to derive the matrix in part from chemically synthesized spinel and/or mullite. Thus, Okata, et al., "Characterization of Spinel Phase from $SiO_2$—$Al_2O_3$ Xerogels and the Formation Process of Mullite," Journal of the American Ceramic Society, 69 [9] 652-656 (1986), the entire contents of which are incorporated herein by reference disclose that two kinds of xerogels can be prepared by slow and rapid hydrolysis of tetraethyoxy silane and aluminum nitrate nonahydrdate dissolved in ethanol. The slow hydrolysis method involves gelling the above mixture in an oven at 60° C. for one to two weeks whereas the rapid hydrolysis method involves adding ammonium hydroxide solution to the mixture and drying in air. Xerogels prepared by the slow hydrolysis method crystallizes mullite directly from the amorphous state on firing whereas the xerogels formed by rapid hydrolysis crystallizes a spinel phase before mullite formation. As long as such calcined synthetic materials have a water pore volume within the scope of this disclosure, such materials can be used to derive, at least in part, the high-alumina matrix of the catalyst of this disclosure.

FIG. 1 illustrates different types of crystalline boehmite, according to one embodiment. A crystalline boehmite crystallite 110 may have a plurality of sides that have a one or more corresponding lengths. The greatest of the one or more corresponding lengths may be the crystallite size. Two or more crystalline boehmite crystallites 110 may form a crystalline boehmite agglomerate 120 (e.g., crystalline boehmite agglomerate 120). A crystalline boehmite solid 130 may include more crystalline boehmite crystallites 110 than the crystalline boehmite agglomerate 120. The crystalline boehmite solid 130 may be highly dispersible. In one embodiment, the crystallites of the one or more of the crystalline boehmite agglomerate 120 or crystalline boehmite solid 130 may have a defined XRD pattern. In another embodiment, one or more of the crystalline boehmite agglomerate 120 or crystalline boehmite solid 130 may be fully crystallized (e.g., not have any portion that is amorphous).

In order to passivate contaminant metals, such as nickel and vanadium, the catalyst matrix may further include an alumina source, such as primary crystalline boehmite agglomerates 120 derived from highly dispersible crystalline boehmite solids 130. In one embodiment, the crystalline boehmite solids 130 are synthetic boehmite aluminas of high purity, with equal or less than 20 ppm of $Na_2O$, equal or less than 100 ppm of $Fe_2O_3$, and equal or less than 120 ppm of $SiO_2$.

In one embodiment, the crystalline boehmite crystallite 110 has a crystallite size of larger than 150 Å. In another embodiment, the crystalline boehmite crystallite 110 has a crystallite size of less than 500 Å. In another embodiment, the crystalline boehmite crystallite 110 has a crystallite size of less than 400 Å. In another embodiment, the crystalline boehmite crystallite 110 has a crystallite size of less than 300 Å. Commercially available crystalline boehmite are, but not limited to, CATAPAL B®, PURAL 200®, PURAL BT®, DISPAL 15N®, DISPAL 23N® from Sasol.

Crystalline boehmite solids 130 are dispersed by dispersants to form primary crystallite boehmite agglomerate 120, that when converted to gamma alumina, enable an unexpected increase in gasoline yield and an unexpected reduction in hydrogen and coke yield for the inventive FCC catalyst. For making the FCC catalyst, in one embodiment, upon calcination at least 80% of the primary crystalline agglomerates 120 are converted to transitional alumina, or gamma alumina. In another embodiment, upon calcination at least 98% of the primary crystalline agglomerates 120 are converted to transitional alumina, or gamma alumina. In another embodiment, upon calcination at least 97% of the primary crystalline agglomerates 120 are converted to transitional alumina, or gamma alumina. The primary crystalline boehmite agglomerate particles having the mentioned crystallite size range increases the percentage of the reactive phase of the catalyst, enabling an unexpected reduction of hydrogen and coke yields, and an increase in gasoline yield.

As illustrated by FIG. 1, crystalline boehmite solids 130 are the ready-made, large blocks composed of packed crystalline boehmite crystals. Such solids, when applied to be incorporated into FCC catalyst, are dispersed in either surfactants or acid solutions to be reduced in size to primary crystalline boehmite agglomerate particles, which cannot be broken down further, without exerting more energy than is require to produce the FCC catalyst. The crystallite size mentioned here is that of the size of the crystalline boehmite crystallite 110.

Other aluminas such as pseudo-boehmite with low dispersibility, and gibbsite are not as effective and the FCC catalyst preferably contains no pseudo-boehmite as the starting crystalline boehmite solids. Dispersibility of the hydrated alumina is the property of the alumina to disperse effectively in an acidic media such as formic acid of pH less than about 3.5. Such acid treatment is known as peptizing the alumina or the crystalline boehmite solids, into primary crystalline boehmite agglomerates. Monoprotic acids, preferably formic, can be used to peptize the crystalline boehmite. Other acids that can be employed to peptize the alumina are nitric and acetic. High dispersion is when 90% or more of the alumina disperses into particles less than about 1 micron.

Alternatively, crystalline boehmite may also be dispersed by polymeric dispersants. Useful polymeric dispersants are of polymers such as anionic, cationic and non-ionic polyacrylamides; anionic, cationic and non-ionic polyacrylates; anionic, cationic and non-ionic copolymers of acrylamides and acrylates; anionic, cationic and non-ionic acrylic acid/sulfonic acid copolymers; anionic, cationic and non-ionic maleic acid homopolymers; and anionic, cationic and non-ionic maleic acid/acrylic acid copolymers. One such commercially available polymeric dispersant is known in the art as a partially hydrolyzed polyacrylamide (PHPA) with the tradename ALCOMER® 110RD, which is actually a copolymer of sodium acrylate and acrylamide, and which is available from Ciba Specialty Chemicals Corporation. Other examples include ZEETAG™ 7888, a cationic polyacrylamide supplied as a liquid dispersion by Ciba; and dispersants sold by SNF Inc. under the FLOSPERSE™ product name, including acrylic acid homopolymers, such as FLOSPERSE™ 9000, 9500, 10000, 15000; acrylamide/acrylic acid copolymers, such as FLOSPERSE™ 4000 C; acrylic acid/sulfonic copolymers, such as FLOSPERSE™ 9000 SL or FLOSPERSE™ 9000 SH; Maleic acid homopolymers, such as FLOSPERSE™ PMA 2A or FLOSPERSE™ PMA 3; Maleic acid/acrylic acid copolymers, such as FLOSPERSE™10030 CM; and Acrylic acid/acrylic esters such as FLOSPERSE™ 3040CH.

The surface area (average Brunauer-Emmett-Teller (BET), nitrogen) of the crystalline boehmite, as well as the gamma-delta alumina conversion product, upon calcination, in one embodiment is below about 250 m$^2$/g. In another embodiment, the surface area (average BET) is below 125 m$^2$/g. In another embodiment, the surface area (average BET) is below 100 m$^2$/g. In another embodiment, the surface area (average BET) is from 30 to 80 m$^2$/g.

Table 2, below, shows typical properties of fully peptizable and dispersible crystalline boehmite agglomerates 120, which can be used in practice of the disclosure.

TABLE 2

| | |
|---|---|
| Al$_2$O$_3$ wt. % | 99.0 min. (ignited) |
| Carbon wt. % | 0.5 max. |
| SiO$_2$ wt. % | 0.015 max. |
| Fe$_2$O$_3$ wt. % | 0.015 max. |
| Na$_2$O wt. % | 0.005 max. |
| Surface Area m$^2$/g | (before calcination) 50-400 |
| Pore volume (cc/g) | 70% in pores having radii from 5 to 1,000 Å units |
| Total volatiles | ~20 wt. % max. |

During production, the primary crystalline boehmite agglomerates 120 are calcined prior to incorporation into the microsphere. As a result of calcination, the crystalline boehmite is converted to a porous gamma phase and to a lesser extent a delta alumina. The BET surface area of this material increases marginally, e.g., increases from 80 m$^2$/g to 100 m$^2$/g. The calcined boehmite converted to the gamma phase is added to the slurry of hydrous kaolin, metakaolin, and other alumina matrix components and spray dried into the microspheres. Upon zeolite crystallization, the gamma alumina will not be leached from the microspheres by the alkaline silicate solution. When the dispersed alumina solution is calcined and spray dried with the kaolin and binder, the resulting microsphere contains uniformly distributed gamma alumina throughout the microsphere.

In one embodiment, the pore volume of the crystallized zeolite microsphere, which is formed using hydrous kaolin to form the catalyst matrix, is greater than 0.15 cc/gm. In another embodiment, the pore volume of the crystallized zeolite microsphere is greater than 0.25 cc/gm. In another embodiment, the pore volume of the crystallized zeolite microsphere is greater than 0.30 cc/gm of Hg in the range of a 40-20,000 Å diameter. In another embodiment, the catalyst has a macropore volume within pores having a size range of a 600 to 20,000 Å diameter of at least 0.07 cc/gm of Hg. In another embodiment, the catalyst has a macropore volume within pores having a size of at least 0.10 cc/gm of Hg. While conventional zeolite-incorporated catalysts have macroporosities comparable to the catalysts of this disclosure, the incorporated catalysts do not have the zeolite-on-matrix morphology or performance of the catalysts of this disclosure. In one embodiment, the catalysts have a BET surface area less than 500 m$^2$/g. In another embodiment, the catalysts have a BET surface area less than 475 m$^2$/g. In another embodiment, the catalysts have a BET surface area within a range of about 300-450 m$^2$/g. The moderate surface area of the catalysts in combination with the macroporosity achieves the desired activity and selectivities to gasoline while reducing gas and coke yields.

The steam-aged surface area and activity may be balanced against the available pore volume. The surface areas for finished product (fresh) catalyst are chosen such that the surface area after a 1500° F., four hour steaming at 1 atm steam pressure are generally below 300 m$^2$/g.

It has further been found that the macroporosity of the catalyst is maintained even if a portion of the matrix is derived from calcined or additional coarse alumina-containing materials which otherwise have a low water pore volume as determined by the ISP test described above.

A quantity (e.g., 3 to 30/o by weight of the kaolin) of zeolite initiator may also be added to the aqueous slurry before it is spray dried. As used herein, the term "zeolite initiator" may include any material containing silica and alumina that either allows a zeolite crystallization process that would not occur in the absence of the initiator or shortens significantly the zeolite crystallization process that would occur in the absence of the initiator. Such materials are also known as "zeolite seeds." The zeolite initiator may or may not exhibit detectable crystallinity by x-ray diffraction (XRD).

Adding zeolite initiator to the aqueous slurry of kaolin before it is spray dried into microspheres is referred to herein as "internal seeding." Alternatively, zeolite initiator may be mixed with the kaolin microspheres after they are formed and before the commencement of the crystallization process, a technique which is referred to herein as "external seeding."

The zeolite initiator used in the present disclosure may be provided from a number of sources. For example, the zeolite initiator may comprise recycled fines produced during the crystallization process itself. Other zeolite initiators that may be used include fines produced during the crystallization process of another zeolite product or an amorphous zeolite initiator in a sodium silicate solution. As used herein, "amorphous zeolite initiator" shall mean a zeolite initiator that exhibits no detectable crystallinity by x-ray diffraction.

The seeds may be prepared as disclosed by in U.S. Pat. No. 4,493,902. Seeds, according to one embodiment, are disclosed in U.S. Pat. No. 4,631,262.

After spray drying, the microspheres may be calcined at low temperature, e.g., for two to four hours in a muffle furnace at a chamber temperature of less than 1000° F. It is important that during calcination the hydrated kaolin component of the microspheres is not converted to metakaolin, leaving the hydrous kaolin, and optional spinel or gamma alumina components of the microspheres essentially unchanged. Alternatively, if the microspheres are formed with a sodium silicate binder, the microspheres may be acid-neutralized to enhance ion exchange of the catalysts after crystallization. The acid-neutralization process comprises co-feeding uncalcined, spray dried microspheres and mineral acid to a stirred slurry at controlled pH. In one embodiment, the rates of addition of solids and acid are adjusted to maintain a pH of about 2 to 7. In another embodiment, the rates of addition of solids and acid are adjusted to maintain a pH from about 2.5 to 4.5. In another embodiment, the rates of addition of solids and acid are adjusted to maintain a pH with a target of about 3 pH. The sodium silicate binder is gelled to silica and a soluble sodium salt, which is subsequently filtered and washed free from the microspheres. The silica gel-bound microspheres are then calcined at low temperature.

Y-faujasite is allowed to crystallize by mixing the kaolin microspheres with the appropriate amounts of other constituents (including at least sodium silicate and water), as discussed in detail below, and then heating the resulting slurry to a temperature and for a time (e.g., to 200°–215° F. for 10-24 hours) sufficient to crystallize Y-faujasite in the microspheres. The prescriptions of U.S. Pat. No. 4,493,902 may be followed as written. Equivalent, reformatted recipes are provided as follows, however.

The crystallization recipes are based on a set of assumptions and certain raw materials. The seeds are described by U.S. Pat. No. 4,631,262 and may be used externally. The $SiO_2$, $Al_2O_3$, and $Na_2O$ components of metakaolin, seeds, sodium silicate solution, calcined sodium silicate binder, and silica gel are assumed to be 100% reactive. The silica-alumina and alumina derived from the hydrous kaolin and the calcined boehmite, respectively, are assumed to be completely unreactive for zeolite synthesis. The alumina and silica in kaolin calcined through the exotherm to the spinel form are assumed to be 1% and 90% reactive respectively. Although these two values are in use, they are not believed to be accurate. The alumina and silica in kaolin calcined through the exotherm to the mullite form are assumed to be 0% and 67% reactive, respectively. These two values are believed to be accurate, representing the inertness of 3:2 mullite in crystallization and the full solubility of the free silica phase. Since metakaolin alumina is the limiting reagent in the synthesis and the volume of zeolite is much larger than the corresponding volume of metakaolin, it is important to limit the zeolite yield appropriately for a given microsphere pore volume. Otherwise, there will result little or no residual pore volume after crystallization. On the other hand, if insufficient limiting reagent is available in the microsphere to grow sufficient zeolite to appropriately strengthen the catalyst, additional nutrient alumina may be added in the form of metakaolin microspheres. Thus, tight process control is enabled for pore volume and attrition resistance.

Using these assumptions, Table 3, below, shows weight ratios for reactive components that may be used in the overall crystallization recipes. Inert components do not enter into the ratios, except in the case of the seeds dose, which is defined as the ratio of the grams of seeds $Al_2O_3$ to total grams of microspheres (MS).

TABLE 3

| Ratio of Components | $SiO_2/Na_2O$ | $SiO_2/Al_2O_3$ | $H_2O/Na_2O$ | Seeds dose $Al_2O_3$/MS |
|---|---|---|---|---|
| 1st Embodiment of Weight Ratios | 2.50-3.1 | 4.5-15 | 5-15 | .01-0.0001 |
| 2nd Embodiment of Weight Ratios | 2.55-2.95 | 5.5-8 | 5.5-8 | 0.006-0.001 |
| 3rd Embodiment of Weight Ratios | 2.75 | 7.0 | 7.0 | 0.004 |
| 4th Embodiment of Weight Ratio (Acid-neut.) | 2.9 | | | |

The sodium silicate and sodium hydroxide reactants may be added to the crystallization reactor from a variety of sources. For example, the reactants may be provided as an aqueous mixture of N® Brand sodium silicate and sodium hydroxide. As another example, at least part of the sodium silicate may be provided by the mother liquor produced during the crystallization of another zeolite-containing product.

After the crystallization process is terminated, the microspheres containing Y-faujasite are separated from at least a substantial portion of their mother liquor (e.g., by filtration). It may be desirable to wash to microspheres by contacting them with water either during or after the filtration step. The purpose of the washing step is to remove mother liquor that would otherwise be left entrained within the microspheres.

"Silica Retention" may be practiced. The teachings of U.S. Pat. No. 4,493,902 at column 12, lines 3-31, regarding silica retention are incorporated herein by cross-reference.

After crystallization by reaction in a seeded sodium silicate solution, the microspheres contain crystalline Y-faujasite in the sodium form. In order to obtain a product having acceptable catalytic properties, sodium cations in the microspheres are replaced with more desirable cations. This may be accomplished by contacting the microspheres with solutions containing ammonium or rare earth cations or both. The ion exchange step or steps are preferably carried out so that the resulting catalyst contains less than about 0.7%, most preferably less than about 0.5% and most preferably less than about 0.4%, by weight $Na_2O$. After ion exchange, the microspheres are dried to obtain the microspheres of the present disclosure. In order to make 0 (zero) wt. % rare earth (REO) catalysts, the Na cations are exchanged by using only an ammonium salt such as $NH_4NO_3$ and without using any rare earth salt during exchange. Such 0 (zero) wt. % REO catalysts are especially beneficial as FCC catalysts that give higher octane gasoline and more olefinic product. Rare earth versions of catalysts of this disclosure, post treated after crystallization by ion-exchange with high levels of rare earth, e.g., by procedures such as described in U.S. Pat. No. 4,493,902, may be used when high activity is sought and the octane rating of the FCC gasoline produce is not of prime importance. Rare earth levels in the range of 0.1% to 12% usually between 0.5% and 7% (weight basis) are contemplated. Following ammonium and rare earth exchange, the catalyst is calcined at 1100°–1200° F. for 1-2 hours and unit cell size of the Y zeolite is reduced. Preferably, this calcination is done in a covered tray with 25% free moisture present.

In one embodiment, the catalyst of the disclosure includes microspheres containing at least 15% and preferably from 40 to 65% by weight Y-faujasite, expressed on the basis of the as-crystallized sodium faujasite form zeolite. As used herein, the term Y-faujasite shall include synthetic faujasite zeolites exhibiting, in the sodium form, an X-ray diffraction pattern of the type described in Breck, Zeolite Molecular Sieves, p. 369, Table 4.90 (1974), and having a crystalline unit cell size, in the sodium form (after washing any crystallization mother liquor from the zeolite), of less than about 24.75 Å as determined by the technique described in the ASTM standard method of testing titled "Determination of the Unit Cell Size Dimension of a Faujasite Type Zeolite" (Designation D3942-80) or by an equivalent technique. The term Y-faujasite shall encompass the zeolite in its sodium form as well as in the known modified forms, including, e.g., rare earth and ammonium exchanged forms and stabilized forms. The percentage of Y-faujasite zeolite in the microspheres of the catalyst is determined when the zeolite is in the sodium form (after it has been washed to remove any crystallization mother liquor contained within the microspheres) by the technique described in the ASTM standard method of testing titled "Relative Zeolite Diffraction Intensities" (Designation D3906-80) or by an equivalent technique. It is important to equilibrate the microspheres carefully before X-ray evaluations are made since equilibration can have a significant effect on the results.

In one embodiment, the Y-faujasite component of the microspheres, in their sodium form, has a crystalline unit cell size of less than about 24.73 Å. In another embodiment, the Y-faujasite component of the microspheres, in their sodium form, has a crystalline unit cell size of less than about 24.69 Å.

Table 4 below sets forth ranges for the chemical composition and surface areas (e.g., total surface area (TSA), mineral surface area (MSA), zeolite (ZSA)) and unit cell size (UCS) of catalysts formed in accordance with this disclosure.

TABLE 4

| Range | Low | High |
|---|---|---|
| $SiO_2$, wt. % | 35 | 65 |
| $Al_2O_3$, wt. % | 30 | 60 |
| TSA, $m^2/g$ | 300 | 475 |
| MSA, $m^2/g$ | 60 | 120 |
| ZSA, $m^2/g$ | 190 | 415 |
| UCS, A | 24.40 | 24.72 |

Conditions useful in operating FCC units utilizing catalyst of the disclosure are well-known in the art and are contemplated in using the catalysts of the disclosure. These conditions are described in numerous publications including Catal. Rev.-Sci. Eng., 18 (1), 1-150 (1978), which is incorporated herein by cross-reference. The catalysts of this disclosure that contain the calcined dispersable boehmite are particularly useful in cracking residuum and resid-containing feeds having a Ni+V metals content of at least 2,000 ppm and a Conradson carbon content greater than 1.0.

The catalyst of the present disclosure may be hydrothermally deactivated during the operation of the cracking unit. Accordingly, as used herein, the phrase "cracking the petroleum feedstock in the presence of a catalyst" shall include cracking the petroleum feedstock in the presence of the catalyst in its fresh, partially deactivated, or fully deactivated form.

Conventionally, it was thought that the less porous catalyst microspheres were superior products in view of the excellent attrition resistance, high activity, and selectivity provided, especially in light of the conventional fact that these catalysts have selectivity at least equivalent to lower surface area, higher pore volume catalysts, and frequently better selectivity at short contact time. Assertions to the contrary would easily be dismissed as self-serving and would also be tantamount to saying the so-called incorporated catalysts were diffusion-limited at short residence time. It has only recently been discovered that under the short contact time FCC processing, FCC catalysts technologies may be diffusion limited with respect to transport in pores external to the zeolite. This is proposed to be the reason that the American Petroleum Institute (API) gravity of the bottoms fraction has often risen after short contact time (SCT) revamp. Conventional catalysts fail to provide all of the potential gains of the SCT hardware. But heretofore there was no way to know what benefits were absent. Accordingly, the catalyst microspheres of this disclosure have a substantially different morphology than the previous catalyst microspheres, especially with respect to the increased pore volume, zeolite-on-matrix morphology, and moderate surface area. Attrition resistance of these catalysts is good and effective for the SCT FCC processing conditions.

The method of preparation and subsequent properties such as mercury pore volume, the catalyst of this disclosure includes a macroporous matrix in which the macropores of the matrix are formed from a random configuration of porous matrix planar structures which are lined with the zeolite crystals. Thus, the macropores of the catalyst are lined with the active zeolite crystals. The macroporosity of the catalyst allows the hydrocarbons to enter the catalyst freely and the increased macropore surface area thereof allows such hydrocarbons to contact the catalytic surfaces. Importantly, the hydrocarbons can contact the zeolite unobstructed, rendering the catalyst very active and selective to gasoline. While conventional incorporated zeolite catalysts, in which the zeolite crystals are incorporated within a binder and/or matrix, have a highly porous matrix, at least a portion of the binder coats or other compositions obstruct the zeolite crystals. In the present microspheroidal catalysts, there is no need for a separate physical binder which glues the zeolite to the matrix surface other than any minute amounts of silicate which may remain subsequent to zeolite crystallization. The microsphere catalysts formed in accordance with the process of the present disclosure yield the highest accessibility to the zeolite of any zeolite/matrix catalyst.

Also, optionally present in a highly dispersed state are the particles of metal-passivating alumina. While there is a preponderance of zeolite lining the macropore walls of the disclosure, smaller particles presumed to be formed from the dispersed crystalline boehmite and/or mullite are also seen.

It has been found that the microspheroidal catalysts of the present disclosure provide high conversions via low coke selectivity and higher selectivities to gasoline relative to previous FCC catalysts presently on the market. It is surprising that this catalyst can consistently outperform conventional incorporated catalysts of similar or even higher porosity and lower surface area. This shows that having added porosity alone is not sufficient. The structured catalysts, being both macroporous and with the macropore walls lined with zeolite and with the mesoporous (e.g., containing pores with diameters between 2 and 50 nm) or microporous matrix (e.g., containing pores with diameters less than 2 nm) produced in part from crystalline boehmite of crystallite size of greater than 150 Å and less than 500 Å, are reasons that the catalyst excels at gasoline, hydrogen and coke selectivity. The present catalyst is sufficient to crack the heavier hydrocarbons and anticipated to improve the API gravity of the bottom fraction, especially during the short contact time processing.

Samples containing crystalline boehmite having different crystallite sizes were tested. The reactive surface areas, the size of the particle formed from agglomerated crystals, and the porosity or accessibility of alumina surfaces were also measured. These structural factors on performance were found to have unexpected influences on FCC catalysts. The structure/function data generated experimentally was then subjected to multivariate statistical data mining in order to reveal relationships between alumina structural features and catalyst performance, specifically hydrogen, coke, and gasoline yields. The results indicate that indeed catalysts containing varied boehmite aluminas show a range of performance characteristics and that the size of the as received alumina crystallite is perhaps the best predictor of performance.

First, crystallite size measurements were done by Rietveld analysis of the as received alumina XRD pattern. The aluminas were also activated for 3 hours at 550° C. in tray calcinations to convert to the gamma-form. Then, catalysts were prepared using the unactivated form of each alumina, which was prepared into slurry form using FLOSPERSE® dispersant. Calcined kaolin (mullite) (36.6 kg) slurry made to 49% solids was added to 59% solids hydrous kaolin (25.9 kg), while mixing, using a Cowles mixer. Next a 56% solids boehmite alumina (14 kg) slurry was slowly added to the mixing clay slurry and was allowed to mix for more than five minutes. The mixture was screened and transferred to a spray dryer feed tank. The clay/boehmite slurry was spray dried with sodium silicate injected in-line just prior to entering the atomizer. Sodium silicate (20.2 kg, 3.22 modulus) was used at a metered ratio of 1.14 liter/min slurry:0.38 liter/min silicate. The target particle size for the microspheres was 80 microns. Binder sodium was removed from the formed microspheres by slurrying the microspheres for thirty minutes and maintaining the pH from 3.5-4 using sulfuric acid. Finally, the acid neutralized microspheres were dried and calcined at 1350-1500° F. for two hours. The microspheres were processed to grow 60-65% zeolite Y using an in-situ crystallization process. A sample of crystallized NaY microspheres (250 g) was ion exchanged to achieve a $Na_2O$ of 2.0% using ammonium nitrate. Lanthanum was then added to 3 wt. % REO. The rare earth exchanged sample was calcined at 1000° F. for 2 hours to stabilize the catalyst and facilitate zeolitic sodium removal. After calcinations, a series of ammonium nitrate ion exchanges was performed to achieve less than 0.2 wt. % $Na_2O$. Finally, with the reduced sodium, a second calcination was done at 1100° F. for 2 hours in order to further stabilize the catalyst and reduce unit cell size. The catalyst composition is further impregnated with 3000 ppm nickel and 1000 ppm vanadium and aged in the presence of 90% steam and 10% air at 1500° F. for 5 hours. The catalytic activity and selectivity of the catalyst composition is determined using Advanced Cracking Evaluation (ACE) reactors and protocols.

The crystallite size of the as received alumina ranged from 954 Å to 42 Å. Each alumina sample was activated to the gamma-form by treatment at 550° C. for 3 hours in order to measure the activated surface area and particle size, which range from 99 to 468 $m^2$/g and 1.5 to 264 microns, respectively. The alumina samples were prepared into standard FCC catalyst formulations as described above and conditioned with 3000 ppm nickel and 1000 ppm vanadium. The range of pore volume for the deactivated catalysts is from 0.2584 to 0.3988 mL/g. The zeolite surface area ranged from 123-193 $m^2$/g and the matrix surface area ranged from 44-69 $m^2$/g. Samples A-U are shown in Table 5 below.

TABLE 5

| Sample Name | A | B | C | D | E | F | G |
|---|---|---|---|---|---|---|---|
| 90%< | 131 | 45.47 | 40.06 | 234 | 216.6 | 0.658 | 847.6 |
| APS (microns) | 66.24 | 20.06 | 0.276 | 151.2 | 120.9 | 0.527 | 339.4 |
| Crystallite Size (Å) | 42 | N/A | 256 | 107 | 74 | 303 | 62 |
| Deactivated Catalyst w/Alumina | | | | | | | |
| TSA | 204 | 262 | 219 | 188 | 168 | 215 | 224 |
| MSA | 56 | 69 | 55 | 48 | 45 | 51 | 69 |
| ZSA | 148 | 193 | 164 | 140 | 123 | 164 | 155 |
| Ni (ppm) | 2999 | 3206 | 3171 | 3460 | 3230 | 3290 | 3384 |
| V (ppm) | 1037 | 1002 | 983 | 1090 | 1040 | 1060 | 1011 |
| Catalytic Data @ 70% Conv. w/Alumina | | | | | | | |
| H2 | 0.94 | 0.98 | 0.80 | 1.04 | 0.91 | 0.91 | 1.00 |
| Gasoline | 45.61 | 50.90 | 50.87 | 46.00 | 46.27 | 47.23 | 47.19 |
| Coke | 6.94 | 3.82 | 3.92 | 7.45 | 7.05 | 6.50 | 6.30 |

| Sample Name | H | I | J | K | L | M | N |
|---|---|---|---|---|---|---|---|
| 90%< | 198.3 | 51.55 | 3.89 | 13.1 | 1.4 | 31 | 31 |
| APS (microns) | 73.53 | 9.948 | 2.17 | 1.56 | 0.525 | 2.14 | 2.14 |
| Crystallite Size (Å) | 116 | 260 | 954 | 873 | 402 | 427 | 427 |
| Deactivated Catalyst w/Alumina | | | | | | | |
| TSA | 183 | 196 | 224 | 227 | 229 | 224 | 221 |
| MSA | 50 | 52 | 56 | 60 | 56 | 64 | 64 |
| ZSA | 133 | 144 | 168 | 167 | 173 | 160 | 157 |

TABLE 5-continued

| | | | | | | | |
|---|---|---|---|---|---|---|---|
| Ni (ppm) | 3290 | 3355 | 3135 | 3334 | 3163 | 3285 | 3272 |
| V (ppm) | 1016 | 1022 | 1070 | 1040 | 1013 | 1033 | 1151 |
| Catalytic Data @ 70% Conv. w/Alumina | | | | | | | |
| H2 | 0.70 | 0.72 | 0.97 | 0.94 | 0.71 | 0.78 | 0.82 |
| Gasoline | 45.33 | 46.71 | 48.44 | 48.98 | 49.43 | 49.92 | 49.40 |
| Coke | 6.77 | 6.29 | 5.81 | 5.35 | 4.22 | 4.31 | 4.46 |

| Sample Name | O | P | Q | R | S | T | U |
|---|---|---|---|---|---|---|---|
| 90%< | 17 | 7.8 | 3.77 | 4.58 | 3.434 | 22.06 | 58.04 |
| APS (microns) | 4.54 | 1.78 | 2.25 | 2.37 | 2.021 | 2.97 | 2.92 |
| Crystallite Size (Å) | 761 | 597 | 878 | 950 | 700 | 515 | 678 |
| Deactivated Catalyst w/Alumina | | | | | | | |
| TSA | 214 | 232 | 204 | 191 | 191 | 187 | 188 |
| MSA | 61 | 64 | 52 | 54 | 54.2 | 45.1 | 43.9 |
| ZSA | 153 | 168 | 152 | 137 | 137 | 142 | 144 |
| Ni (ppm) | 3308 | 3249 | 2981 | 3051 | 3028 | 3296 | 3190 |
| V (ppm) | 1031 | 1045 | 1026 | 1021 | 1041 | 957 | 967 |
| Catalytic Data @ 70% Conv. w/Alumina | | | | | | | |
| H2 | 0.99 | 0.81 | 1.07 | 1.14 | 1.17 | 1.09 | 0.82 |
| Gasoline | 48.11 | 48.71 | 47.98 | 47.85 | 47.66 | 46.38 | 45.88 |
| Coke | 5.83 | 4.90 | 6.12 | 5.83 | 5.67 | 6.20 | 6.05 |

The data was then subjected to multivariate statistical data mining, exploring both the structure in the data and the relationship to the relevant parameters (Hydrogen, Gasoline and Coke output).

Figure 2:
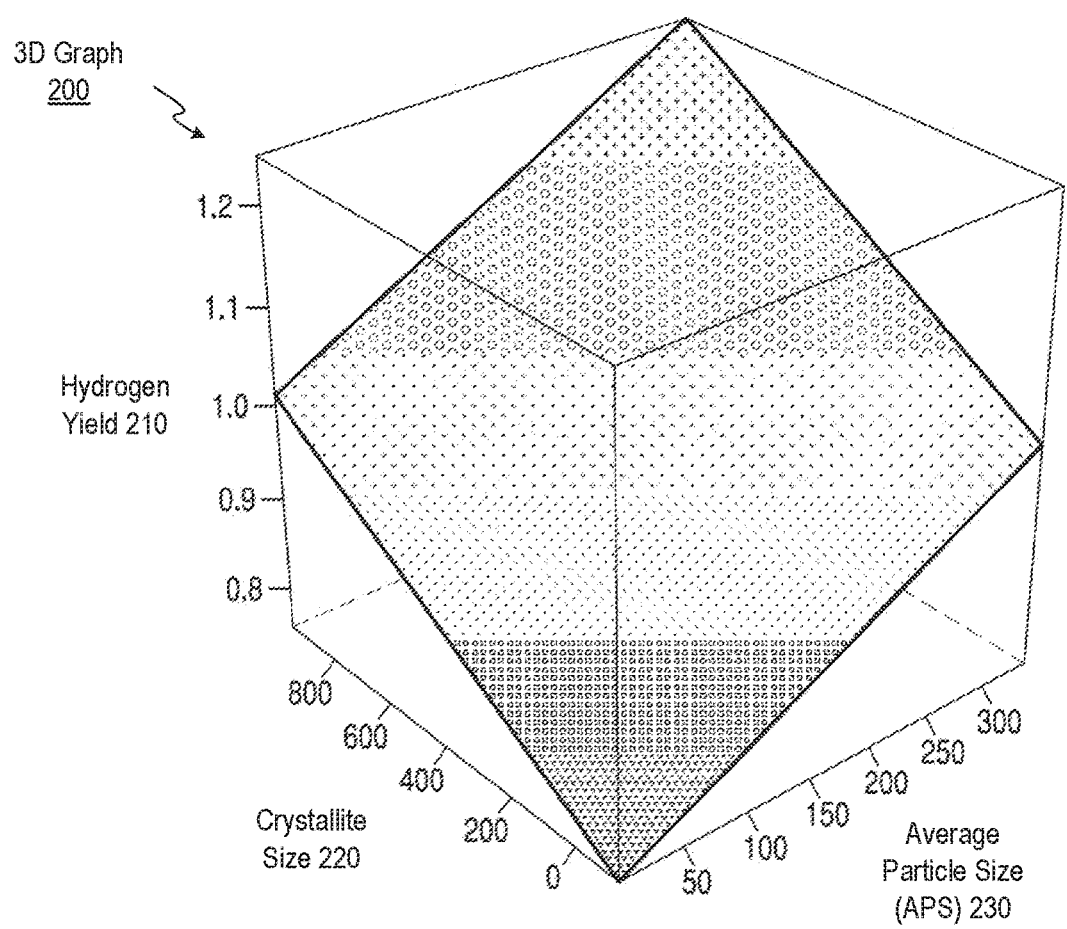
FIG. 2 is a three-dimensional graph illustrating the hydrogen yield in view of crystallite size and average particle size (APS), according to one embodiment.

FIG. 2 is a three-dimensional graph 200 illustrating the hydrogen yield 210 in view of crystallite size 220 and average particle size (APS) 230, according to one embodiment. As shown in FIG. 2, the crystallite size 220 (e.g., 0-800 Å) and APS 230 (e.g., 50-300 nm) of the as received alumina are strongly correlated with the final catalytic performance such as overall hydrogen yield 210 (e.g., 0.8-1.2 weight %). In one embodiment, the hydrogen yield 210 is a hydrogen coke yield. The hydrogen yield 210 is positively correlated with both the crystallite size 220 and APS 230, meaning that as each is decreased so too is the hydrogen yield 210. This result can be understood in terms of the formation of nickel aluminate, in that reduction of both crystallite size 220 and APS 230 creates more reactive surface area that may contribute to the reaction of nickel (and possibly other metals) to form less catalytically active materials. In one embodiment, a crystallite size 220 of 500 Å and APS 230 of 225 nm has a hydrogen yield 210 of about 0.85 weight %. In another embodiment, a crystallite size 220 of 200 Å and an APS 230 of 100 nm has a hydrogen yield 210 of about 0.8 weight %. In another embodiment, a crystallite size 220 of 800 Å and APS 230 of 300 nm has a hydrogen yield 210 of about 0.95 weight %.

What is claimed is:

1. A method of reducing contaminant coke and hydrogen yields, the method comprising passivating, during catalytic cracking, nickel and vanadium with a zeolite fluid catalytic cracking catalyst comprising dispersible crystalline boehmite, wherein the dispersible crystalline boehmite has a crystallite size of less than 500 Å, wherein the dispersible crystalline boehmite comprises crystalline agglomerates having an average particle size of 50 nm to 300 nm, the crystalline agglomerates being formed from discrete and nonspherical boehmite crystallites each characterized by the crystallite size of less than 500 Å.

2. The method of claim 1, wherein the zeolite fluid catalytic cracking catalyst comprises: Y-faujasite crystallized in-situ from a metakaolin-containing calcined microsphere; and an alumina-containing matrix obtained by calcination of the dispersible crystalline boehmite and a kaolin contained in the metakaolin-containing calcined microsphere.

3. The method of claim 1, wherein the hydrogen yield is less than 0.85 weight % during the catalytic cracking.

4. The method of claim 1, wherein the hydrogen yield is less than 0.80 weight % during the catalytic cracking.

5. A method of catalytic cracking of heavy hydrocarbon feed stocks, the method comprising passivating, during the catalytic cracking, nickel and vanadium with a zeolite fluid catalytic cracking catalyst comprising dispersible crystalline boehmite, wherein the dispersible crystalline boehmite has a crystallite size of less than 500 Å, wherein the dispersible crystalline boehmite comprises crystalline agglomerates having an average particle size of 50 nm to 300 nm, the crystalline agglomerates being formed from discrete and nonspherical boehmite crystallites each characterized by the crystallite size of less than 500 Å.

6. The method of claim 5, wherein the zeolite fluid catalytic cracking catalyst comprises: Y-faujasite crystallized in-situ from a metakaolin-containing calcined microsphere; and an alumina-containing matrix obtained by calcination of the dispersible crystalline boehmite and a kaolin contained in the metakaolin-containing calcined microsphere.

7. The method of claim 5, wherein overall hydrogen yield is less than 0.85 weight % during the catalytic cracking.

8. The method of claim 5, wherein overall hydrogen yield is less than 0.80 weight % during the catalytic cracking.

9. The method of claim 1, wherein the crystallite size of the dispersible crystalline boehmite is greater than 150 Å.

10. The method of claim 1, wherein the crystallite size of the dispersible crystalline boehmite is less than 400 Å.

11. The method of claim 1, wherein an average Brunauer-Emmett-Teller (BET) surface area of the zeolite fluid catalytic cracking catalyst is less than 500 m$^2$/g.

12. The method of claim 1, wherein an average BET surface area of the zeolite fluid catalytic cracking catalyst is from about 300 to about 450 m$^2$/g.

13. The method of claim 2, wherein calcination of the dispersible crystalline boehmite and the kaolin occurs at a temperature of less than 1000° F. so as to avoid endothermic transformation of the kaolin to metakaolin.

14. The method of claim 5, wherein the crystallite size of the dispersible crystalline boehmite is greater than 150 Å.

15. The method of claim 5, wherein the crystallite size of the dispersible crystalline boehmite is less than 400 Å.

16. The method of claim 5, wherein an average Brunauer-Emmett-Teller (BET) surface area of the zeolite fluid catalytic cracking catalyst is less than 500 m$^2$/g.

17. The method of claim 5, wherein an average BET surface area of the zeolite fluid catalytic cracking catalyst is from about 300 to about 450 m$^2$/g.

18. The method of claim 6, wherein calcination of the dispersible crystalline boehmite and the kaolin occurs at a temperature of less than 1000° F. so as to avoid endothermic transformation of the kaolin to metakaloin.

19. The method of claim 18, wherein after calcination, the dispersible crystalline boehmite has a surface area ranging from 99 to 468 m$^2$/g and a particle size of 1.5 microns to 264 microns.

* * * * *